United States Patent
Nanno et al.

(10) Patent No.: US 6,688,532 B2
(45) Date of Patent: Feb. 10, 2004

(54) CONTROLLER, TEMPERATURE CONTROLLER AND HEAT PROCESSOR USING SAME

(75) Inventors: Ikuo Nanno, Okayama (JP); Yoshihiro Nagami, Okayama (JP); Naotaka Uchiyama, Okayama (JP); Gen Yoneda, Okayama (JP); Masahito Tanaka, Okayama (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/300,150

(22) Filed: Nov. 19, 2002

(65) Prior Publication Data

US 2003/0102383 A1 Jun. 5, 2003

(30) Foreign Application Priority Data

Nov. 30, 2001 (JP) ......................................... 2001-366142

(51) Int. Cl.[7] ............................................. G08B 21/00
(52) U.S. Cl. ..................... 236/78 D; 700/29; 340/611; 340/610
(58) Field of Search ....................... 236/78 D; 340/611, 340/610; 700/29

(56) References Cited

U.S. PATENT DOCUMENTS

| | | | |
|---|---|---|---|
| 4,861,960 A | | 8/1989 | Haefner et al. ............. 219/110 |
| 5,121,332 A | * | 6/1992 | Balakrishman et al. |
| 5,341,663 A | | 8/1994 | Knapp ............................. 72/8 |
| 5,544,039 A | | 8/1996 | Hiroi ........................... 364/151 |
| 5,568,378 A | * | 10/1996 | Wojsznis |
| 6,453,229 B1 | * | 9/2002 | Ohkuma et al. ............ 701/109 |

FOREIGN PATENT DOCUMENTS

EP 0296500 12/1988

OTHER PUBLICATIONS

Patent Abstract of Japan, vol. 2000, No. 26(Jul. 1, 2001) & JP 2001–265408 (Yokoyama Shuichi; Ikegai Corp) (Sep. 28, 2001).
Patent Abstract of Japan,, vol. 012, No. 361 (P–763), (Sep. 28, 1988) & JP 63–111504 (OMRON Tateishi Electronics Co), (May 16, 1988).
Patent Abstract of Japan,, vol. 014, No. 219 (P–1045), (May 9, 1990) & JP 02–050201 (Toshiba Corp), (Feb. 12, 1990).

* cited by examiner

*Primary Examiner*—William Wayner
(74) *Attorney, Agent, or Firm*—Beyer Weaver & Thomas LLP

(57) ABSTRACT

A controller controls a physical variable such as temperature of a controlled system. A variable calculator calculates and output a manipulated variable on the controlled system based on of a target value such as a target temperature and a feedback value such as the measured temperature of the controlled system. A dead-time compensator provides a dead-time compensated output using a model simulating the controlled system having a dead time and an idealized model having no dead time, based on the manipulated variable outputted from the variable calculator to carry out an ordinary control and a dead-time compensated control. A switch functions to select the dead-time compensated control by providing a dead-time compensated output to the variable calculator or an ordinary control providing no dead-time compensated output to the variable calculator. The dead-time compensated control is carried out at least during set point response of the controller.

17 Claims, 7 Drawing Sheets

CONTROLLER, TEMPERATURE CONTROLLER AND HEAT PROCESSOR USING SAME

BACKGROUND OF THE INVENTION

This invention relates to a control device, or a controller, for controlling a physical condition such as temperature and pressure of a controlled system, a temperature controller for controlling the temperature of a controlled system, and a heat processor using such a temperature controller. More in detail, this invention relates to such a controller, a temperature controller and a heat processor carrying out a control by using a model such as the Smith method (also known as the Smith-predictor and the Smith compensated method).

It has been known in the PID control, say, of temperature to set the PID gain weakly in order to control the overshoot at the time of set point response. If the PID gain is made too weak for the control, however, it comes to take too long to reach the set temperature and hence such a control cannot be practically usable where a quick rise in temperature is required. In such a situation, therefore, the Smith method is sometimes used in order to control the overshoot at the time of set point response by compensating for the dead time while making it possible to raise the temperature quickly with a strong PID gain. The Smith method may be characterized as controlling a system by treating it as a controlled system without the dead time, carrying out a dead-time compensated control by internally setting a controlled model.

Since the Smith method can control the overshoot at the time of set point response, the PID gain can be set more strongly than in an ordinary PID control. For this reason, however, the problem of hunting becomes more troublesome than in an ordinary PID control in the presence of external disturbance. Another problem with the Smith method is that a controlled model must be set internally but that it is not easy to obtain parameters such as the process gain and the time constant that are necessary in setting such a controlled model.

SUMMARY OF THE INVENTION

It is therefore an object of this invention to control the problems of overshoot and hunting both at the time of set point response and disturbance response in a control by using a model and also to make it easier to obtain parameters for the model.

In view of the above, a controller according to this invention may be characterized as comprising means ("a variable calculator" herein) for calculating and outputting a manipulated variable on a controlled system based on of a target value which has been set and a feedback value obtained by a measurement, a dead-time compensator for providing a dead-time compensated output using models based on the manipulated variable outputted from the variable calculator, and a switch which is for selecting between a dead-time compensated control by providing a dead-time compensated output to the variable calculator and an ordinary control providing no dead-time compensated output to the variable calculator and functions to switch to the dead-time compensated control at least during set point response of the controller. In the above, the ordinary control means a control not carrying out dead-time compensation, using no dead-time compensated output.

According to this invention, overshoot and hunting can be controlled because dead-time compensated control is carried out at least at the time of set point response. Since an ordinary control is effected at other times, hunting due to disturbances can be controlled better than if the dead-time compensated were continued.

According to one example of the invention, the dead-time compensator has two models, one simulating the controlled system having a first-order delay and a dead time (the "simulating model" herein), and an idealized dead-time compensated model which simulates the controlled system having no dead time. The dead-time compensated control uses the Smith method with a stronger control gain than a control gain for an ordinary control. Thus, the target temperature can be obtained quickly while the overshoot is controlled because the Smith method is used with a stronger control gain during set point response of the controller. Since an ordinary control with a weaker control gain is effected at other times, the hunting caused by external disturbances can also be controlled.

A heat controller according to this invention may be characterized similarly as the controller described above except that the controlled physical variable is the temperature of the controlled system and have similar effects.

The variable calculator described above may be adapted to output PI or PID variables. Control parameters for the models may be determined by the step response method or the limit cycle method. They may also be determined by a manipulated variable and a detected temperature after the detected temperature has settled or from a change in the measured temperature after the control is temporarily interrupted. The parameters may include the process gain or the time constant. These parameters may be obtained first by obtaining the maximum slope and dead time as done conventionally and either the process gain or the time constant is obtained such that all parameters necessary for determining the models may be obtained.

Heat processors of this invention are characterized as comprising a controlled system, an apparatus for heating or cooling the controlled system, and a temperature controller as described above. Heat processors of this invention include apparatus for thermal oxidization used in the production process for semiconductors, diffusion furnaces, CVD devices and molding apparatus. The merits of the heat processors of this invention are the same the same as those of the thermal controllers of this invention.

DETAILED DESCRIPTION OF THE INVENTION

Figure 1:
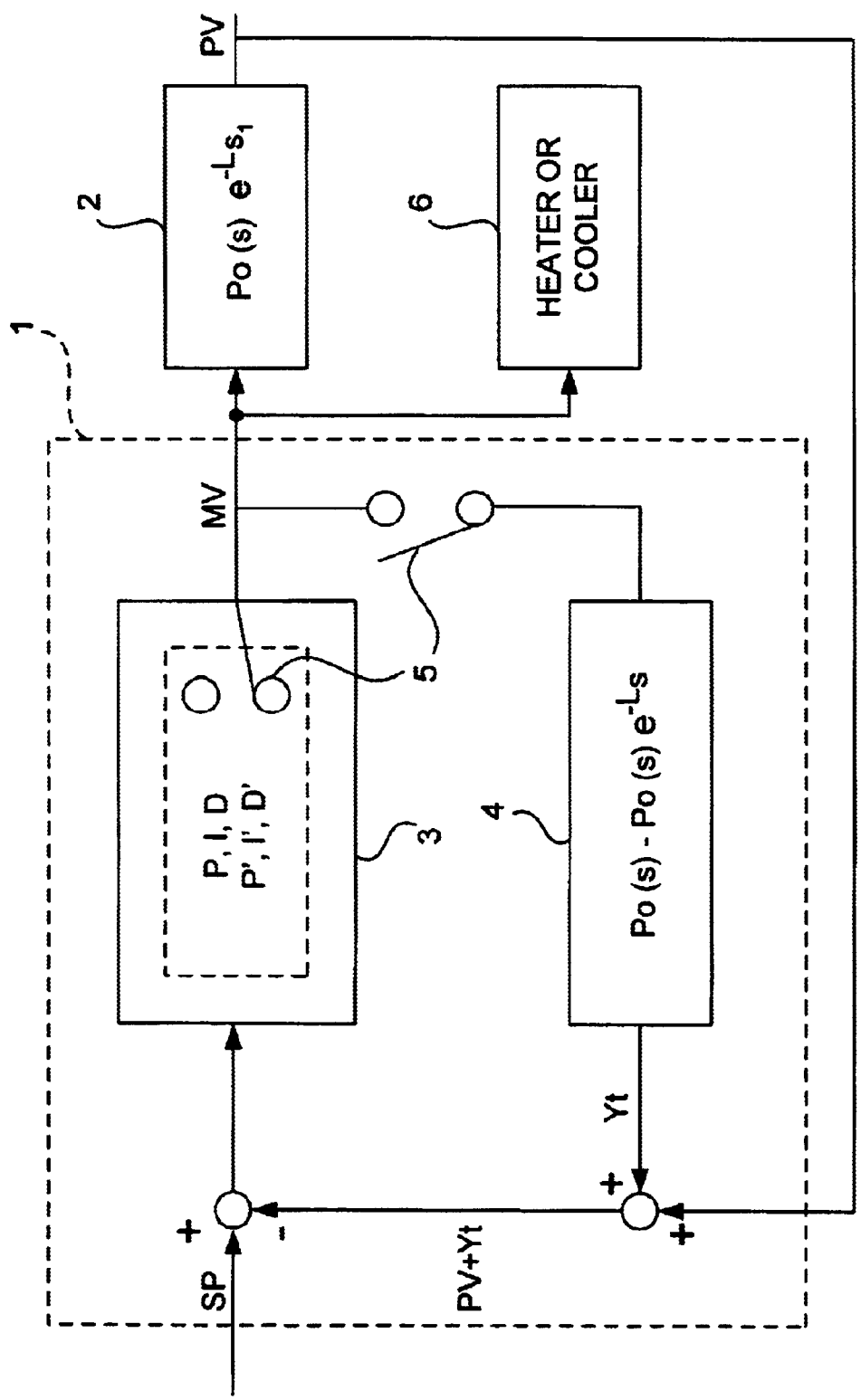
FIG. 1 is a block diagram of a heat processor with a temperature controller embodying this invention.

FIG. 1 shows a heat processor 1 embodying this invention including a heater and/or a cooler (a "heater-cooler 6" herein) and a temperature controller adapted to control the temperature of a control object ("a controlled system" herein) 2 based on a target (set point) temperature SP inputted through an input device (not shown) and a detected temperature (process variable) PV of the controlled system 2 received as a feedback input from a sensor (not shown). For this purpose, the temperature controller of the heat processor 1 is provided with a PID calculator 3 (also "a variable calculator" herein) for calculating and outputting a PID manipulated variable MV based on the deviation of the detected temperature PV serving as the feedback quantity from the set point temperature SP, as well as a dead-time compensator 4 which generates a dead-time compensated output Yt based on this PID manipulated variable MV.

The PID calculator 3 is provided with two kinds of PID gain including a stronger PID gain (P, I, D) and a weaker PID gain (P', I', D') and serves to calculate and output the PID manipulated variable MV by using the stronger PID gain (P, I, D) at the time of a PID control with dead-time compensation by the Smith method by using the output Yt from the dead-time compensator 4 and the weaker PID gain (P', I', D') at the time of an ordinary PID control using no output from the dead-time compensator. The weaker PID gain (P', I', D') may be set equal, for example, to the PID gain obtained by an ordinary auto-tuning. The stronger PID gain (P, I, D) may be set, for example, three times as strong as the weaker PID gain (P', I', D').

According to the present example, the dead-time compensator 4 has two models, (1) a model which simulates the controlled system having a first-order delay and a dead time (the "simulating model" herein), and (2) an idealized model which simulates the controlled system having no dead time (the "dead-time compensated model" herein). Methods of determining parameters for these models will be described below.

If $P_0(s)$ is the transfer function for the dead-time compensated model, the transfer function for the simulating model having a first-order delay and a dead time may be written as $P_0(s)e^{-Ls}$. The dead-time compensator 4 may serve to transmit to the input side of the PID calculator 3 an output $(P_0(s)-P_0(s)e^{-Ls})$. Although models having a first-order delay are explained herein, it goes without saying that the present invention is applicable also to higher-order models having a second-order delay.

In the dead-time compensated control, the output Yt from the dead-time compensator 4 is added to the detected temperature PV from the temperature sensor to provide an apparent temperature (PV+Yt) and its deviation from the set point temperature SP is calculated and transmitted to the PID calculator 3.

In order to control the overshoot and hunting both in set point response and disturbance response, the output Yt from the dead-time compensator 4 is added to the detected temperature PV to be transmitted to the PID calculator 3 and a dead-time compensated PID control is carried out by using the stronger PID gain (P, I, D) at the time of set point response but a switch 5 is operated at other times, such as after the measured temperature PV has "settled," to separate the dead-time compensator 4, and an ordinary PID control using the weaker PID gain (P', I', D') is started.

It is to be reminded in the above that "the time of set point response" is not limited to the initial time of rise but also includes the situation where the set point temperature is changed after the temperature has once settled, that is, where the condition of the controlled system is suddenly changed such that the deviation, or the difference between the set point temperature SP and the measured temperature PV, increases suddenly. A situation like this may occur when the liquid inside a tank is heated to keep its temperature at a constant level such as 100° C. but the liquid has become contaminated and is replaced with a new liquid at a lower temperature such as 20° C.

To summarize the principle of this invention, a PID control is carried out with dead-time compensated by the Smith method at the time of set point response such that the overshoot and hunting can be controlled and since the PID gain is made stronger than in an ordinary PID control without using the Smith method, the time to reach the set point temperature can be reduced. After the settling of the temperature (or after the temperature settled within a specified range of the set point temperature), the mode of control is switched to an ordinary PID control with a weaker PID gain and without using the Smith method such that the overshoot and hunting due to disturbances can be controlled. The judgment whether the temperature has settled or not may be made by determining whether or not the detected temperature has settled within a specified range around the set point temperature or whether or not the output from the dead-point compensator 4 has become 0. Manipulated variables other than integrated variable such as the proportional and derivative variables may be used for the judgment.

Figure 2:
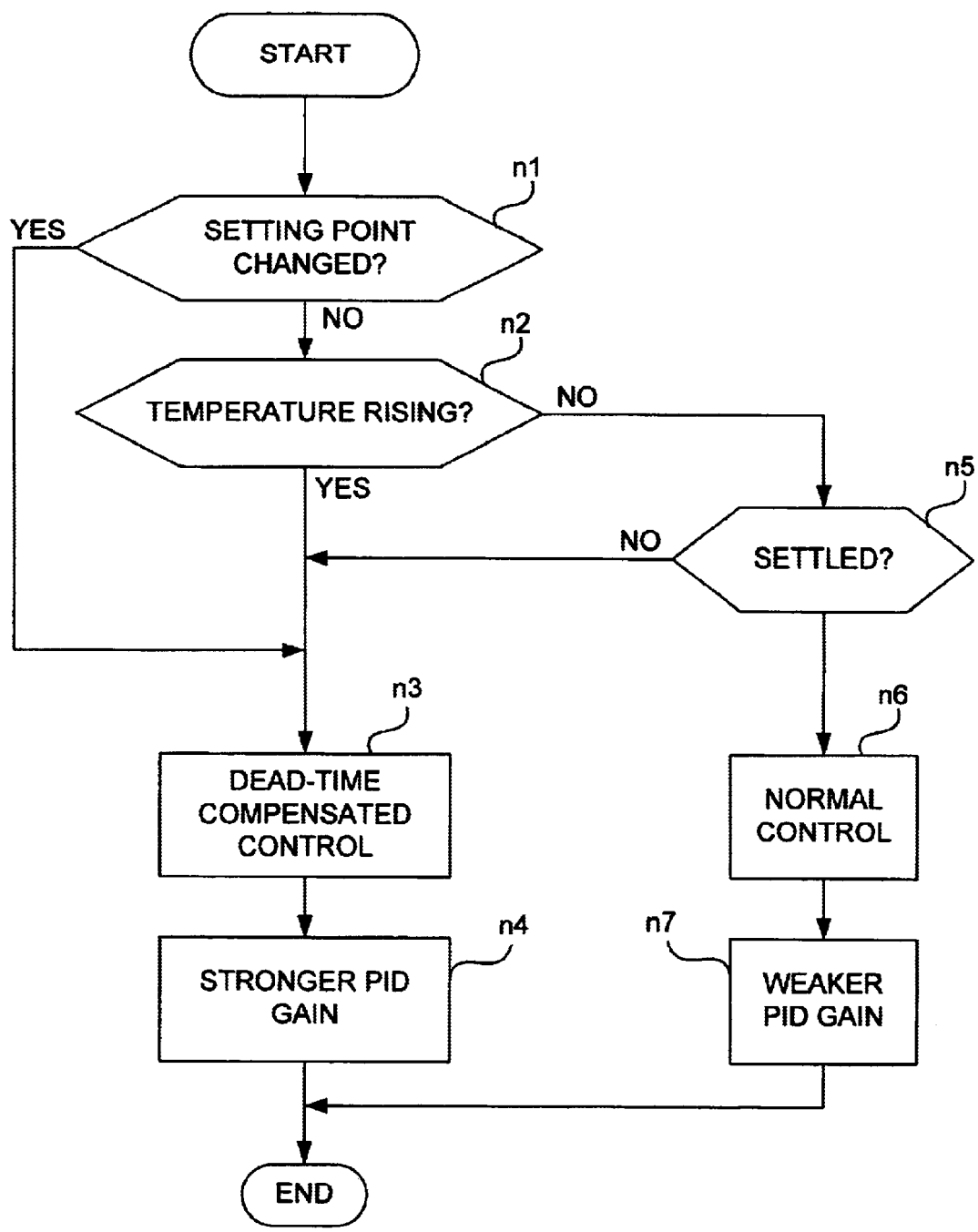
FIG. 2 is a flowchart of a control embodying this invention.

The flowchart of FIG. 2 is referenced next to explain the PID control with dead-time compensated by the Smith method and the ordinary PID control not using the Smith method according to this invention. First, it is determined whether or not the set point has been changed (Step n1). If the set point has been changed (YES in Step n1), the dead-time compensated PID control using the Smith method is started (Step n3) and the stronger PID gain is selected (Step n4).

If it is determined that the set point has not been changed (NO in Step n1), it is checked whether or not the temperature is rising (Step n2). If it is determined that the temperature is rising (YES in Step n2), the program proceeds to Step n3 and continues with the dead-time compensated control. If the temperature is determined not to be rising (NO in Step n2), it is checked whether or not the temperature has settled (Step n5). If it is determined that the temperature has settled (YES in Step n5), the program switches to the ordinary PID control not using the Smith method (Step n6) and selects the weaker PID gain (Step n7).

Figure 3:
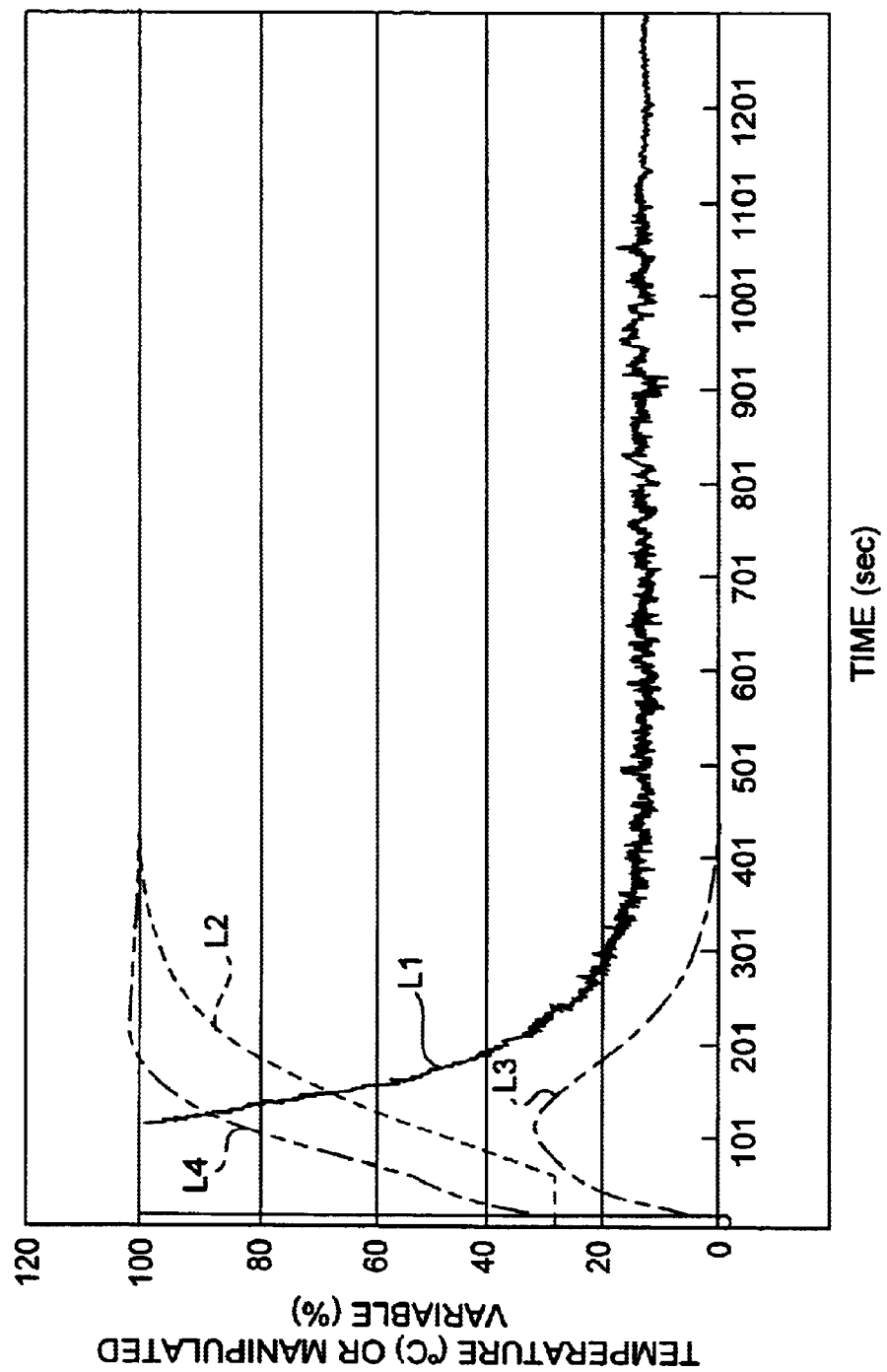
FIG. 3 is a waveform diagram for various signals in dead-time compensated control by the heat processor of FIG. 1.

FIG. 3 shows the waveforms of various signals shown in FIG. 1 in the dead-time compensated control using the Smith method. In FIG. 3, Line L1 indicates the PID manipulated variable MV from the PID calculator 3, Line L2 indicates the actually detected temperature PV of the controlled system 2, Line L3 indicates the output Yt from the dead-time compensator 4, and Line L4 indicates the apparent temperature (PV+Yt).

As can be understood from FIG. 3, the apparent temperature (PV+Yt) according to the Smith method rises immediately although the actually detected temperature PV rises only after the dead time has elapsed. Thus, the apparent temperature (PV+Yt) can control as an idealized controlled system with no dead time. As the detected temperature PV and the manipulated variable MV stabilize, the output Yt from the dead-time compensator 4 becomes 0 and the actually detected temperature PV and the apparent temperature (PV+Yt) come to match. After the actually detected temperature PV and the apparent temperature (PV+Yt) come to match, the control mode is changed from the dead-time compensated PID control using the Smith method to the ordinary PID control.

Figure 4:
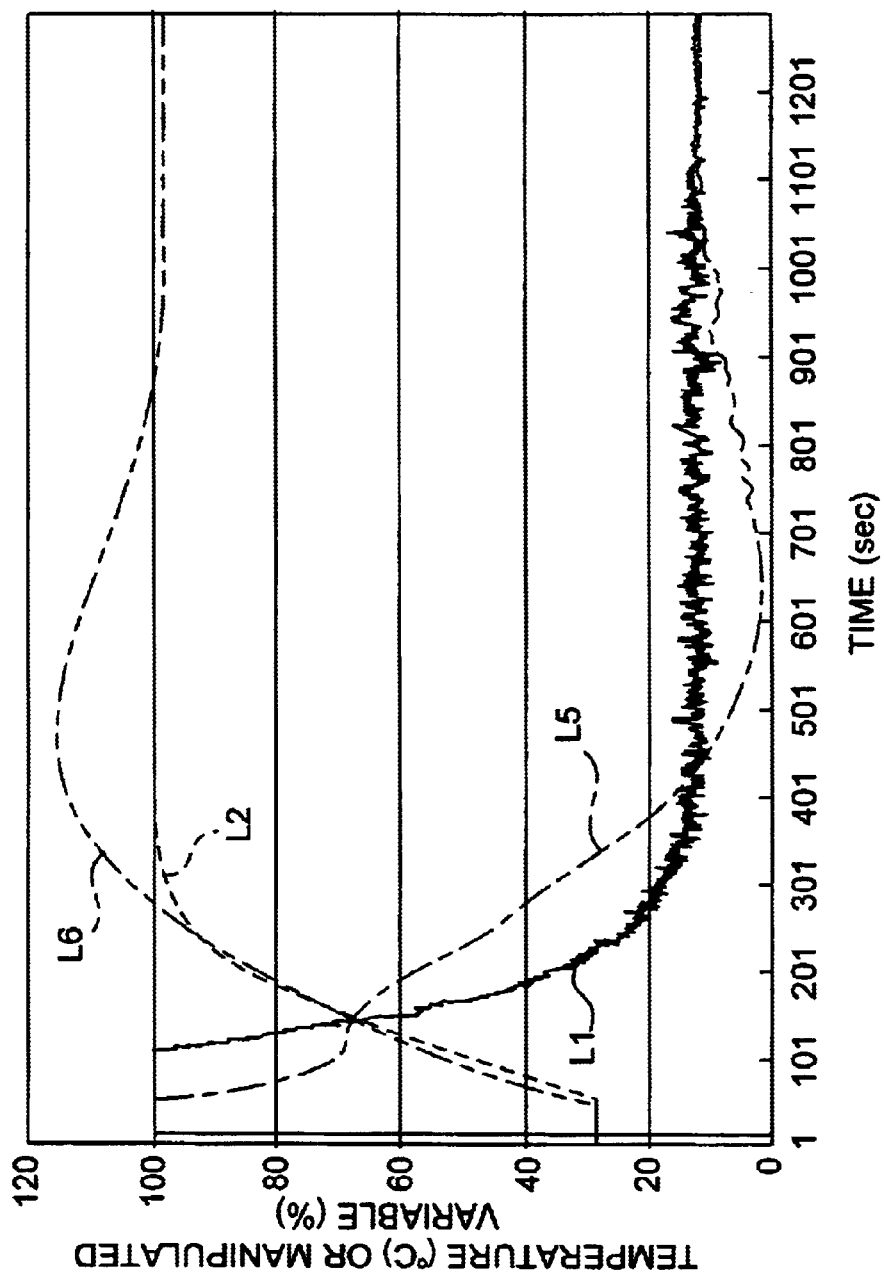
FIG. 4 is a waveform diagram for showing the changes in the manipulated variable and detected temperature by a method of this invention and by a conventional method.

FIG. 4 is for comparing Lines L1 and L2 of FIG. 3 representing MV and PV, respectively, with Lines L5 and L6 indicating respectively the manipulated variable and the detected temperature by the conventional PID control not using the Smith method. It is to be noted that there is an overshoot by the ordinary PID control not using the Smith method but there is no overshoot if the Smith method is used.

As explained above, the control mode is switched to the ordinary PID control after the actually detected temperature PV and the apparent temperature (PV+Yt) come to agree and a weaker PID gain is selected in this PID control. If the set point temperature is changed when this switch is made, the control mode is switched again to the dead-time compensated PID control using the Smith method.

Next, methods of obtaining parameters for setting a model for the dead-time compensator 4 will be explained.

For setting a transfer function of the dead-time compensated model $P_0(s)$, it is necessary to obtain a process gain K, a dead time L and a time constant T. The PID gain is obtained in general by auto-tuning. By the conventional auto-tuning, however, the maximum slope R and the dead time L are obtained and the PID gain is calculated therefrom. In other words, the process gain K and the time constant T which are necessary parameters for setting a model cannot be obtained by the conventional auto-tuning method.

According to this invention, the process gain K or the time constant T is obtained as follows, by making use of the relationship R=K/T.

(1) Calculation of Process Gain K by the Step Response Method

By this method, the process gain K is obtaining by calculating the dead time L and the maximum slope R from the response waveform against a step input as in the conventional auto-tuning method, continuing the step input until the response waveform settles even after the maximum slope R has been calculated, and using the following formula and the change obtained on the output side:

K=(Change on output side in full scale %)/(Change on input side in %) where the change on the output side means the change in temperature and the change on the input side means the percentage change is the manipulated variable.

Figure 5:
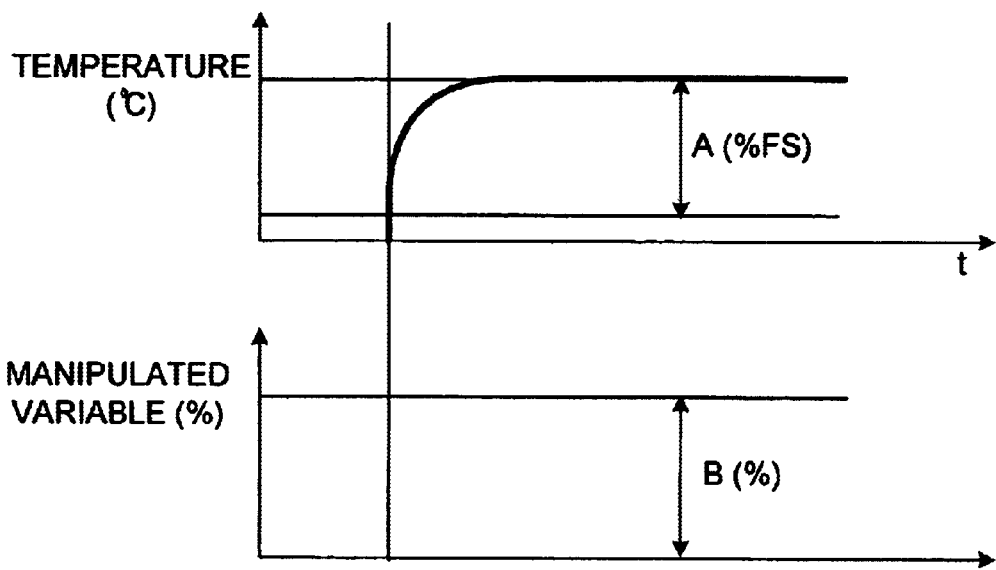
FIG. 5 is a waveform diagram for explaining a method of calculating the process gain by the step response method.

FIG. 5 is a waveform diagram for showing the method of calculating the process gain K by the step response method. In this example, the manipulated variable is B% and the temperature change, which is the change on the output side, is A% against the full scale (FS). Thus, the process gain K is calculated as K=A(% FS)/B(%). Thus, it becomes possible to obtain not only the dead time L and the maximum slope R but also the process gain K by continuing the auto-tuning by the step response method longer than done conventionally.

If the time constant T is large, it takes a long time to calculate the process gain K. In such a situation, it is preferable to select a smaller step input value such as 20%.

(2) Calculation of Process Gain K by Using Settled Manipulated Variable

Figure 6:
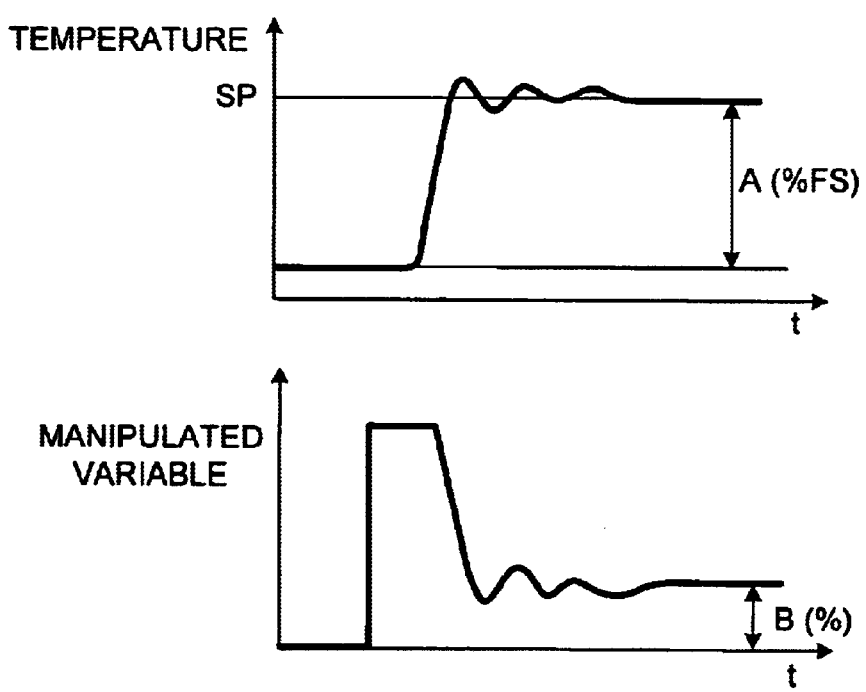
FIG. 6 is a waveform diagram for explaining a method of calculating the process gain by using the settled manipulated variable.

The process gain K is calculated as follows by using the temperature change A(% FS) against the full scale (FS) when the detected temperature has reached and settled at the set point temperature SP and the settled manipulated variable B(%) shown, for example, in FIG. 6:

$K=A(\% \ FS)/B(\%)$.

Since the process gain K is calculated from the temperature change A(% FS) against the settled manipulated variable B(%), it is possible to obtain the process gain K at the set point temperature SP to be controlled.

An average value may be used when the settled manipulated variable is unstable.

(3) Calculation of Process Gain K by Using the Limit Cycle Method

Figure 7:
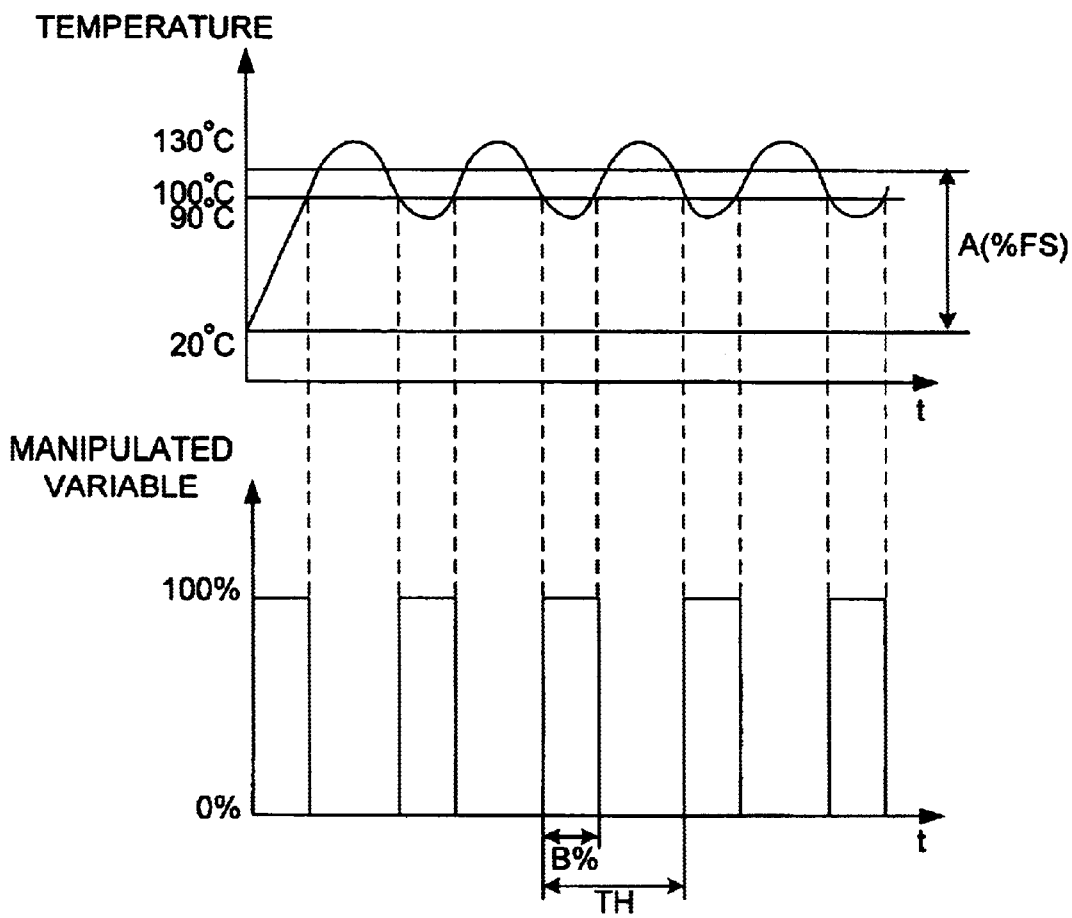
FIG. 7 is a waveform diagram for explaining a method of calculating the process gain by the limit cycle method.

FIG. 7 shows the changes in the detected temperature and the manipulated variable in a limit cycle method wherein the manipulated variable is 100% but is reduced to 0% when the detected temperature reaches 100° C. and set to 100% again when the detected temperature becomes less than 100° C., this sequence being repeated. If the ratio of period in which the manipulated variable is 100% when the temperature has stabilized with respect to the hunting period TH at this time is B% and the ratio of the temperature change to the center of the hunting with respect to the full scale is A% FS, the process gain K is given by K=A/B.

In the example shown in FIG. 7, the detected temperature changes from 20° C. and ends up by moving up and down within a range between 90° C. and 130° C. around 110° C. Thus, A is calculated as the ratio between 90° C.=110° C.−20° C. and the full scale.

By the limit cycle method, the process gain K can be obtained while the PID gain is obtained from the hunting period and amplitude as done conventionally.

(4) Calculation of Time Constant T by the Step Response Method

Figure 8:
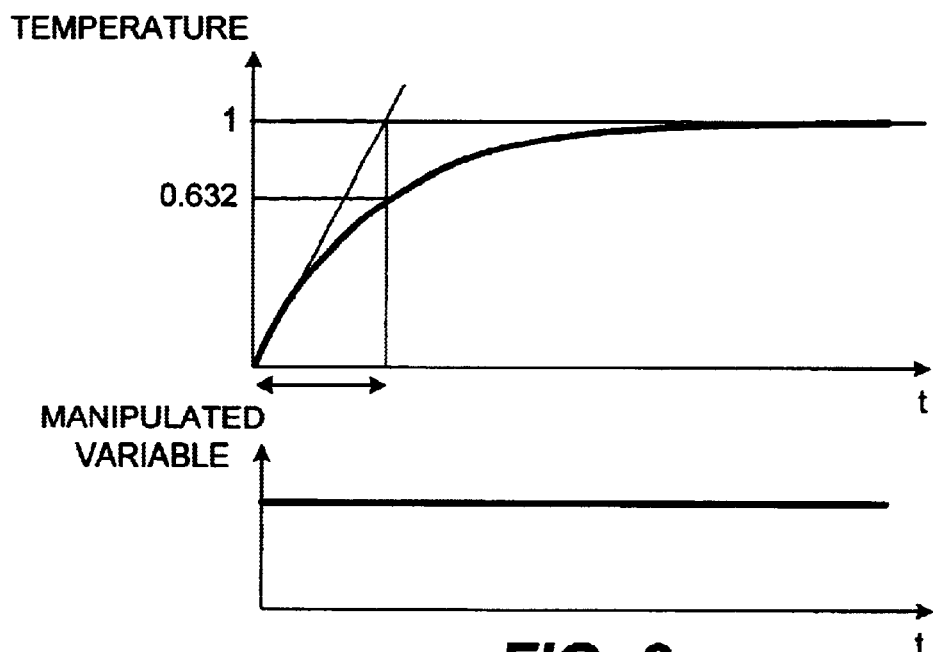
FIG. 8 is a waveform diagram for explaining a method of calculating the time constant by the step response method.

The dead time L and the maximum slope R are calculated from the response waveform in response to a step input as by the conventional auto-tuning method. The step input is continued even after the maximum slope R has been calculated and the time required to reach 63.2% of the settled value is determined as shown in FIG. 8 as the time constant T.

If the time constant is long, its calculation also becomes long. In such a situation, it is preferable to reduce the step input, say, to 20%.

(5) Calculation of Time Constant T by Natural Cooling

Figure 9:
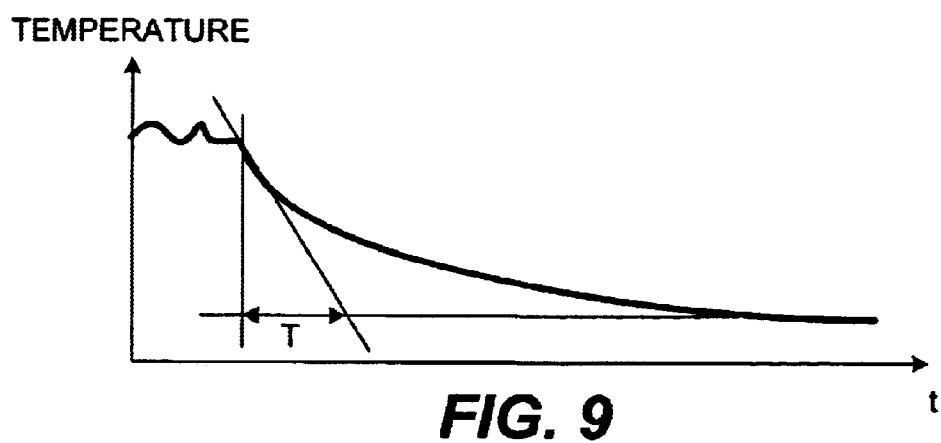
FIG. 9 is a waveform diagram for explaining a method of calculating the time constant by natural cooling.

The control is temporarily stopped when the temperature has risen to a certain level for obtaining the time constant T from the change in temperature by natural cooling. At the moment when the control is interrupted and the natural cooling has started, a tangent to the waveform curve is drawn as shown in FIG. 9 and the crossing point is obtained between this tangent and the horizontal line representing a room temperature, and the time when the control is stopped and this crossing point is determined as the time constant T.

The time constant T can be obtained relatively quickly by this method because it can be obtained as soon as a tangent line can be drawn on the waveform diagram. The original control may be resumed as soon as the maximum slope by the natural cooling has been obtained.

After the process gain K and the time constant T is obtained as explained above and the dead time L is obtained in a conventional way, the transfer function for the dead-time compensated model having a first-order delay and no dead time may be written as $P_0(s)=K/(TS+1)$ and the transfer function for the simulating model having a first-order delay and a dead time may be written as $P_0(s)e^{-Ls}=(K/(TS+1))e^{-Ls}$ where S is the Laplace operator.

The invention has been described above with reference to only a limited number of examples but these examples are not intended to limit the scope of the invention. The methods described above for obtaining the parameters K and T for setting a model are applicable not only to a temperature controller capable of switching between a dead-time compensated PID control using the Smith method and an ordinary PD control but also to a temperature controller carrying out only the dead-time compensated PID control using the Smith method.

Although an example was shown above wherein a dead-time compensated control is carried out at the time of set point response but an ordinary PID control is carried out at other times, a control may be effected when disturbances are anticipated such that a switch may be made from a dead-time compensated control to an ordinary control before such disturbances are applied. Alternatively, it may be so arranged that a dead-time compensated control is carried out also at times other than the time of set point response.

Although an example was shown wherein the PID gain of the dead-time compensated control was made stronger than the PID gain of the ordinary control, this is not intended to limit the scope of the invention. The PID gain need not be made so strong.

Although the invention was described above with reference to the PID control but the present invention is equally applicable to the PI control. Although the invention was described as applied to a temperature controller using a heating apparatus such as a heater, the invention is equally applicable to temperature controls using a cooler. The invention is also applicable to the control of physical quantities other than temperature such as pressure, flow rate, speed and liquid surface level.

In summary, since a dead-time compensated control is carried out at least at the time of set point response according to this invention, the problems of overshoot and hunting can be controlled and since an ordinary control is carried out at other times, hunting due to disturbances can also be controlled.

What is claimed is:

1. A controller comprising:
   a variable calculator for calculating and outputting a manipulated variable on a controlled system based on a target value and a feedback value;
   a dead-time compensator for providing a dead-time compensated output using models based on said manipulated variable outputted from said variable calculator; and
   a switch for causing said controller to selectively carry out either a dead-time compensated control by providing said dead-time compensated output to said variable calculator or an ordinary control by not providing said dead-time compensated output to said variable calculator, said switch switching to said dead-time compensated control at least during set point response by said controller.

2. The controller of claim 1 wherein said models include a simulating model and a dead-time compensated model, wherein said simulating model simulates said controlled system having controlled system, having a first-order delay and a dead time and said dead-time compensated model simulates said controlled system, having a first-order delay and no dead time; wherein said dead-time compensated control uses the Smith method; and wherein said dead-time compensated control has a stronger control gain than a control gain for an ordinary control.

3. A temperature controller comprising:
   a variable calculator for calculating and outputting a manipulated variable on a controlled system based on a target temperature and a detected temperature;
   a dead-time compensator for providing a dead-time compensated output using models based on said manipulated variable outputted from said variable calculator; and
   a switch for causing said controller to selectively carry out either a dead-time compensated control by providing said dead-time compensated output to said variable calculator or an ordinary control by not providing said dead-time compensated output to said variable calculator, said switch switching to said dead-time compensated control at least during set point response by said controller.

4. The temperature controller of claim 3 wherein said models include a simulating model and a dead-time compensated model, wherein said simulating model simulates said controlled system having controlled system, having a first-order delay and a dead time and said dead-time compensated model simulates said controlled system, having a first-order delay and no dead time; wherein said dead-time compensated control uses the Smith method; and wherein said dead-time compensated control has a stronger control gain than a control gain for an ordinary control.

5. The temperature controller of claim 3 wherein said variable calculator outputs variables selected from the group consisting manipulated PI variables and manipulated PID variables.

6. The temperature controller of claim 3 wherein parameters of said models are obtained by a method selected from the group consisting of step response method and limit cycle method.

7. The temperature controller of claim 3 wherein parameters of said models are obtained based on manipulated variables and detected temperature at settled time.

8. The temperature controller of claim 3 wherein parameters of said models are obtained based on changes in the detected temperature after the controls are stopped.

9. The temperature controller of claim 6 wherein the parameters of said models are one or more selected from the group consisting of process gain and time constant.

10. The temperature controller of claim 7 wherein the parameters of said models are one or more selected from the group consisting of process gain and time constant.

11. The temperature controller of claim 8 wherein the parameters of said models are one or more selected from the group consisting of process gain and time constant.

12. A heat processor comprising:
   a controlled system;
   a heating-cooling apparatus for heating or cooling said controlled system; and
   a temperature controller for controlling said heating-cooling apparatus; said temperature controller including:
      a variable calculator for calculating and outputting a manipulated variable on said heating-cooling apparatus based on a target temperature and a detected temperature;
      a dead-time compensator for providing a dead-time compensated output using models based on said manipulated variable outputted from said variable calculator; and
      a switch for causing said controller to selectively carry out either a dead-time compensated control by providing said dead-time compensated output to said variable calculator or an ordinary control by not providing said dead-time compensated output to said variable calculator, said switch switching to said dead-time compensated control at least during set point response by said controller.

13. The heat processor of claim 12 wherein said models include a simulating model and a dead-time compensated model, wherein said simulating model simulates said controlled system having controlled system, having a first-order delay and a dead time and said dead-time compensated model simulates said controlled system, having a first-order delay and no dead time; wherein said dead-time compensated control uses the Smith method; and wherein said dead-time compensated control has a stronger control gain than a control gain for an ordinary control.

14. The heat processor of claim 12 wherein said variable calculator outputs variables selected from the group consisting manipulated PI variables and manipulated PID variables.

15. The heat processor of claim 12 wherein parameters of said models are obtained by a method selected from the group consisting of step response method and limit cycle method.

16. The heat processor of claim 12 wherein parameters of said models are obtained based on manipulated variables and detected temperature at settled time.

17. The heat processor of claim 12 wherein parameters of said models are obtained based on changes in the detected temperature after the controls are stopped.

* * * * *